US011592364B2

(12) United States Patent
Otsuki

(10) Patent No.: US 11,592,364 B2
(45) Date of Patent: Feb. 28, 2023

(54) EXHAUST GAS ANALYSIS APPARATUS, EXHAUST GAS ANALYSIS SYSTEM, EXHAUST GAS MEASUREMENT METHOD, PROGRAM RECORDING MEDIUM RECORDED WITH PROGRAM FOR EXHAUST GAS ANALYSIS APPARATUS, AND CALIBRATION METHOD FOR EXHAUST GAS ANALYSIS

(71) Applicant: HORIBA, Ltd., Kyoto (JP)

(72) Inventor: Yoshinori Otsuki, Kyoto (JP)

(73) Assignee: HORIBA, LTD.

( * ) Notice: Subject to any disclaimer, the term of this patent is extended or adjusted under 35 U.S.C. 154(b) by 252 days.

(21) Appl. No.: 16/144,639

(22) Filed: Sep. 27, 2018

(65) Prior Publication Data
US 2019/0113422 A1 Apr. 18, 2019

(30) Foreign Application Priority Data
Oct. 13, 2017 (JP) .............................. JP2017-199894

(51) Int. Cl.
G01N 1/22 (2006.01)
G01N 15/06 (2006.01)
G01N 15/10 (2006.01)

(52) U.S. Cl.
CPC ......... G01N 1/2252 (2013.01); G01N 1/2205 (2013.01); G01N 15/0618 (2013.01);
(Continued)

(58) Field of Classification Search
CPC .............. G01N 1/2252; G01N 1/2205; G01N 15/0618; G01N 2015/1043;
(Continued)

(56) References Cited

U.S. PATENT DOCUMENTS 6,412,333 B2 * 7/2002 Inoue ................... G01N 1/2252
73/23.2
2004/0237636 A1 12/2004 Bartley et al.
(Continued)

FOREIGN PATENT DOCUMENTS

CN 1888857 A 1/2007
CN 102066900 A 5/2011
(Continued)

OTHER PUBLICATIONS

EESR dated Feb. 26, 2919 issued for European Patent Application No. 18 196 912.2, 9 pgs.
(Continued)

Primary Examiner — Lisa M Caputo
Assistant Examiner — Alex T Devito
(74) Attorney, Agent, or Firm — Brooks Kushman P.C.

(57) ABSTRACT

To provide an exhaust gas analysis apparatus that, without the need to greatly change the flow rate of diluted exhaust gas passing through a filter, can change the flow rate of exhaust gas in the diluted exhaust gas passing through the filter with good followability to reflect weighting, and accurately measure PM, the exhaust gas analysis apparatus is adapted to include: a collection part that collects particulate matter in sampling exhaust gas partially splitting from original exhaust gas or in the diluted exhaust gas resulting from diluting the sampling exhaust gas with diluent gas; and a split flow ratio control mechanism configured to, in accordance with a vehicle driving mode set in compliance with predetermined regulations, change a split flow ratio that is the ratio of the split flow rate of the sampling exhaust gas to the total flow rate of the original exhaust gas.

10 Claims, 11 Drawing Sheets

(52) U.S. Cl.
CPC ........... *G01N 2001/2264* (2013.01); *G01N 2015/1043* (2013.01)

(58) Field of Classification Search
CPC ......... G01N 2001/2264; G01N 1/2247; G01N 15/00; G01N 33/0004; G01N 2001/2255; G01F 1/44; G01F 1/76
See application file for complete search history.

(56) References Cited

U.S. PATENT DOCUMENTS

| | | | | |
|---|---|---|---|---|
| 2006/0243026 | A1* | 11/2006 | Graze | G01M 15/102 73/23.31 |
| 2007/0251307 | A1* | 11/2007 | Graze | G01N 1/2252 73/114.69 |
| 2011/0120096 | A1 | 5/2011 | Nakamura | |
| 2014/0216132 | A1* | 8/2014 | Asami | G01N 1/2252 73/23.31 |
| 2016/0319726 | A1* | 11/2016 | Otsuki | G01N 1/2252 |

FOREIGN PATENT DOCUMENTS

| | | |
|---|---|---|
| CN | 103018079 A | 4/2013 |
| CN | 203732345 U | 7/2014 |
| CN | 104237087 A | 12/2014 |
| CN | 105547766 A | 5/2016 |
| CN | 205538547 U | 8/2016 |
| CN | 106092839 A | 11/2016 |
| EP | 2302354 A1 | 3/2011 |
| EP | 3088861 A1 | 11/2016 |
| JP | 06-040053 A | 2/1994 |
| JP | 2000-088719 A | 3/2000 |
| JP | 2003-050194 A | 2/2003 |
| JP | 2014-153132 A | 8/2014 |
| JP | 2016-212084 A | 12/2016 |
| JP | 2017031872 A | 2/2017 |
| WO | 2000054022 A1 | 9/2000 |

OTHER PUBLICATIONS

Office Action dated Jun. 3, 2021 issued in JP patent application No. 2017-199894, 8 pgs.
Chinese Office Action dated Sep. 5, 2022, Serial No. 2018111292302.

* cited by examiner

|  | COLD START REGION | | | HOT START REGION | |
|---|---|---|---|---|---|
|  | PHASE 1 | PHASE 2 | | PHASE 3 | |
| WEIGHTING FACTOR | 43% | 100% | | 57% | |

FIG.8

EXHAUST GAS ANALYSIS APPARATUS, EXHAUST GAS ANALYSIS SYSTEM, EXHAUST GAS MEASUREMENT METHOD, PROGRAM RECORDING MEDIUM RECORDED WITH PROGRAM FOR EXHAUST GAS ANALYSIS APPARATUS, AND CALIBRATION METHOD FOR EXHAUST GAS ANALYSIS

CROSS-REFERENCE TO RELATED APPLICATION

This application claims priority to Japanese Application No. 2017-199894, filed Oct. 13, 2017, the disclosure of which is incorporated in its entirety by reference herein.

TECHNICAL FIELD

The present invention relates to an exhaust gas analysis apparatus and the like for analyzing a measurement target material contained in exhaust gas.

BACKGROUND ART

As this sort of exhaust gas analysis apparatus, as disclosed in Patent Literature 1, there is one that dilutes the exhaust gas of an internal combustion engine at a predetermined dilution ratio to introduce the diluted exhaust gas to a filter, and measures the mass of particulate matter (hereinafter also referred to as PM) in the diluted exhaust gas collected by the filter.

Meanwhile, in a PM measurement test of recent years, it is legislated to weight measurement results in accordance with a vehicle driving mode, and for example, CFR 1066 stipulates that a measurement result in Phase 1 is weighted by a factor of 0.43, that in Phase 2 by 1, and that in Phase 3 by 0.57.

Methods for such weighting include one that calculates the mass of PM by measuring the mass of PM using one filter for each of the phase intervals, and multiplying the resulting measured values by corresponding ones of the above-described weighting factors to take a weighted average. However, there is a problem that filter replacement work between adjacent phase intervals is time-consuming, and therefore PM measurement becomes troublesome. In addition, in recent years, since PM concentration in exhaust gas has been reduced, the amount of PM collected by a filter used during each phase interval has been extremely small, and therefore it has been difficult to accurately measure the mass of PM.

CITATION LIST

Patent Literatures

Patent Literature 1: Japanese Unexamined Patent Application Publication No. 2003-50194

SUMMARY OF INVENTION

Technical Problem

The present invention has been made in consideration of the problems as described above, and intends to provide an exhaust gas analysis apparatus that, without replacing a filter in accordance with a driving mode, can accurately measure particulate matter.

Solution to Problem

That is, the exhaust gas analysis apparatus according to the present invention includes: a collection part that collects a measurement target component in sampling exhaust gas partially or wholly splitting from original exhaust gas: a diluent gas supply path through which diluent gas flows; and a split flow ratio control mechanism configured to, during a test of a vehicle or a part of the vehicle, change a split flow ratio that is the ratio of the split flow rate of the sampling exhaust gas to a total flow rate of the original exhaust gas.

Note that the original exhaust gas is a concept including raw exhaust gas discharged from an engine or exhaust gas resulting from diluting the raw exhaust gas with diluent gas.

Such an exhaust gas analysis apparatus can weight the flow rate of the sampling exhaust gas flowing to the collection part, and therefore without the need to replace the collection part, can continue to be used as a test proceeds. Accordingly, even when the amount of particulate matter discharged from the vehicle is small, the particulate matter can be collected by the collection part to analyze it with the mass of it being enough to ensure detection accuracy.

Specific embodiments for performing a test reflecting weighting factors stipulated in regulations or the like include one in which the split flow ratio control mechanism is configured to change the split flow ratio in accordance with a vehicle driving mode set in compliance with a predetermined regulation.

In order to allow the collection part to collect a minimum amount of PM detectable by a detector, and accurately perform analysis even when the concentration of PM contained in exhaust gas is very low, it is only necessary that in multiple phase intervals constituting a driving mode, the sampling exhaust gas is adapted to flow to the collection part in common.

Specific examples to enable the reflection of weighting corresponding to respective test contents stipulated in predetermined regulations include one in which the driving mode is constituted by multiple phase intervals, weighting factors are set for the respective phase intervals, and the split flow ratio control mechanism is configured to change the split flow ratio in dependence on the weighting factors set for the respective phase intervals.

In the predetermined regulations, some of the contents of a vehicle running test may be allowed to be integrated or omitted, for example, when cold starting a vehicle and when hot starting the vehicle. In order to make it possible to change the split flow ratio in dependence of corresponding weighting factors even in the case of such modified test contents, it is only necessary that the driving mode is constituted by: a cold start region that is constituted by one or more phase intervals and in which the vehicle is cold started; and a hot start region that is constituted by one or more phase intervals and in which the vehicle is hot started, weighting factors are respectively set for the cold start region and the hot start region, and the split flow ratio control mechanism is configured to change the split flow ratio in dependence of the weighting factors set for the cold start region and the hot start region.

Specific examples adapted to observe regulations stipulating a PM measurement test and the like, change a dilution ratio, and obtain a highly reliable analysis result include one in which the cold start region is constituted by a first phase interval and a second phase interval, the hot start region is constituted by a third phase interval, a ratio among weighting factors respectively for the first phase interval, the second phase interval, and the third phase interval is set to a:1:(1−a), and the split flow ratio control mechanism is configured to change the split flow ratio among the respective phase intervals so that a ratio among split flow ratios in the first phase interval, the second phase interval, and the third phase interval becomes 1/a:1:1/(1−a).

In order to obtain a split flow ratio reflecting a weighting factor assigned to each phase interval by changing the flow rate of the diluent gas, for example, every time a phase interval changes, the exhaust gas analysis apparatus only has to be one further including: a main flow path through which the original exhaust gas flows; a sampling flow path through which the sampling exhaust gas partially splitting from the original exhaust gas flows; and a diluted exhaust gas flow path that is a flow path after merger of the sampling flow path and the diluent gas supply path and through which diluted exhaust gas resulting from diluting the sampling exhaust gas with the diluent gas flows.

Specific control configurations for controlling the split flow ratio include one in which the split flow ratio control mechanism includes: a main flowmeter that measures the total flow rate of the original exhaust gas flowing through the main flow path; a first flowmeter that measures the flow rate of the diluent gas flowing through the diluent gas supply path; a flow rate control valve that is provided in the diluent gas supply path; a second flowmeter that measures the flow rate of the diluted exhaust gas flowing through the diluted exhaust gas flow path; a split flow ratio setting part that sets a target split flow ratio in accordance with a driving mode, a target flow rate calculation part that, on the basis of the total flow rate of the original exhaust gas measured by the main flowmeter, the target split flow ratio set by the split flow ratio setting part, and the measured flow rate of the diluted exhaust gas measured by the second flowmeter, calculates the target flow rate of the diluent gas flowing through the diluent gas supply path, and a first controller that controls the flow rate control valve so that the deviation between the measured flow rate of the diluent gas measured by the first flowmeter and the target flow rate calculated by the target flow rate calculation part decreases.

In such a configuration, since it is not necessary to increase/decrease the total flow rate of the exhaust gas flowing through the collection part, an error due to flow rate response delay is less likely to occur, and analysis accuracy is easily improved. Further, when changing the flow rate of the diluent gas in order to change the split flow ratio, the flow rate can be changed before passing through the collection part. Accordingly, as compared with when changing the total flow rate of the diluted exhaust gas passing through the collection part, a dilution ratio can be changed with good followability to changes in test conditions, and the flow rate of the sampling exhaust gas in the diluted exhaust gas can be regulated to have a value corresponding to a weighting factor or the like. For example, even when a weighting factor changes from 0.43 to 1.00, the amount of the sampling exhaust gas contained in the diluted exhaust gas can be quickly changed to an amount corresponding to the changed weighting factor while keeping the total flow rate of the diluted exhaust gas constant. Accordingly, an error due to response delay of flow rate control can be prevented from occurring, for example, when measuring the mass or the like of particulate matter.

In addition, since the flow rate of the diluted exhaust gas whose flow rate is larger than those of the diluent gas and sampling gas can be kept constant, for example, the flowmeter for measuring the flow rate of the diluted exhaust gas is not required to have a wide measurement range and high accuracy.

In order to make it possible to, without directly controlling the flow rate of the sampling exhaust gas, indirectly change the flow rate of the sampling exhaust gas by controlling the flow rate of the diluent gas while keeping the total flow rate of the diluted exhaust gas passing through the collection part constant, it is only necessary that the split flow ratio control mechanism is one further including: a pump provided in the diluted exhaust gas flow path; and a second controller that controls the pump so that the flow rate of the diluted exhaust gas flowing through the diluted exhaust gas flow path becomes constant at a predetermined flow rate.

An exhaust gas analysis system further including: the exhaust gas analysis apparatus according to the present invention; and an analysis part that analyzes the measurement target component collected by the collection part can achieve accurate analysis because the analysis part can analyze the collected measurement target component with weighting or the like stipulated in regulations or the like reflected.

An exhaust gas analysis method according to the present invention is one using an exhaust gas analysis apparatus including a collection part that collects a measurement target component in sampling exhaust gas partially or wholly splitting from original exhaust gas, and the exhaust gas analysis method includes a split flow ratio changing step of, during a test of a vehicle or a part of the vehicle, changing a split flow ratio that is the ratio of a split flow rate of the sampling exhaust gas to a total flow rate of the original exhaust gas.

Such an exhaust gas analysis method enables the same effects as those of the above-described exhaust gas analysis apparatus to be obtained.

Also, a program recording medium recorded with a program for an exhaust gas analysis apparatus according to the present invention is characterized in that the program is used for the exhaust gas analysis apparatus including a collection part that collects a measurement target component in sampling exhaust gas partially or wholly splitting from original exhaust gas, and instructs a computer to fulfill a function as a split flow ratio control part that, in accordance with a vehicle driving mode set in compliance with a predetermined regulation, changes a split flow ratio that is the ratio of the split flow rate of the sampling exhaust gas to the total flow rate of the original exhaust gas.

When installing such a program for an exhaust gas analysis apparatus in an existing exhaust gas analysis apparatus, while keeping the flow rate of diluted exhaust gas passing through a filter constant as with the above-described exhaust gas analysis apparatus, a dilution ratio can be changed, and the occurrence of a measurement error due to control delay can be reduced. Note that the program may be one electronically delivered or recorded on a program recording medium such as a CD, DVD, or flash memory.

A calibration method for an exhaust gas analysis apparatus according to the present invention is a calibration method for an exhaust gas analysis apparatus including: a diluted exhaust gas flow path through which diluted exhaust gas resulting from, with diluent gas, diluting sampling exhaust gas partially or wholly splitting from original exhaust gas flows; a collection part that is provided in the diluted exhaust gas flow path and collects particulate matter in the diluted exhaust gas; a bypass flow path that, in the diluted exhaust gas flow path, branches from the upstream side of the collection part and merges with the downstream side of the collection part; a second flowmeter that is provided on the downstream side of the merging point of the bypass flow path in the diluted exhaust gas flow path and measures a flow rate through the diluted exhaust gas flow path; and a bypass flow rate control mechanism that controls the bypass flow rate of the diluted exhaust gas flowing through the bypass flow path. In addition, the bypass flow rate control mechanism includes a bypass flowmeter that measures the bypass flow rate of the diluted exhaust gas flowing through the bypass flow path. Further, the calibration method includes: a closing step of closing an inflow path to the filter; and calibrating the bypass flowmeter with the second flowmeter as a reference flowmeter and the bypass flow meter as a flowmeter to be calibrated.

Such a calibration method enables the second flowmeter that measures the total flow rate of the diluted exhaust gas and the bypass flowmeter that measures the bypass flow rate of the diluted exhaust gas flowing through the bypass flow path to be set to have substantially the same sensor characteristics. For this reason, even when the second flowmeter has an error relative to an actual flow rate, the bypass ratio of the diluted exhaust gas can be accurately kept, and the accuracy of measuring PM or the like can be highly accurately kept.

Advantageous Effects of Invention

According to the present invention configured as described above, weighting corresponding to a driving mode can be achieved by changing the split flow ratio, and regardless of a change in driving mode, the mass or the like of PM can be accurately measured using the single collection part without error while observing regulations. Also, the variation range of the flow rate of the diluted exhaust gas passing through the collection part can be decreased, and therefore in order to measure the flow rate, a flowmeter having a wide measurement range and high resolution does not have to be used. Accordingly, the exhaust gas analysis apparatus can be configured to be a simple and inexpensive one.

BRIEF DESCRIPTION OF DRAWINGS

FIG. 8 is a schematic diagram illustrating an example of test conditions in the second embodiment;

DESCRIPTION OF EMBODIMENTS

A first embodiment of the exhaust gas analysis apparatus according to the present invention will be described below.

An exhaust gas analysis apparatus 100 of the first embodiment is one that measures particulate matter (hereinafter also referred to as PM) contained in the exhaust gas of an internal combustion engine as a measurement target component, and in a vehicle running test system 200, used to measure PM discharged from an engine of a vehicle VH in running. In the vehicle running test system 200, the exhaust gas analysis apparatus 100 is configured to sample part of exhaust gas discharged from the engine as an internal combustion engine, and after dilution, introduce the total amount of the diluted exhaust gas to a filter F.

The vehicle running test system 200 is one that performs a running test of a vehicle in a driving mode stipulated in predetermined regulations in a chamber called a cell, and performs exhaust gas analysis, fuel consumption measurement, and the like during the running test. As illustrated in the overall configuration in FIG. 1, the vehicle running test system 200 includes a measurement chamber and a test chamber that are mutually airtightly divided. In the test chamber, a chassis dynamometer SD and the exhaust gas analysis apparatus 100 are arranged. In the measurement chamber, equipment such as a management apparatus (not illustrated) for managing various types of measurement and the like is arranged.

Figure 1:
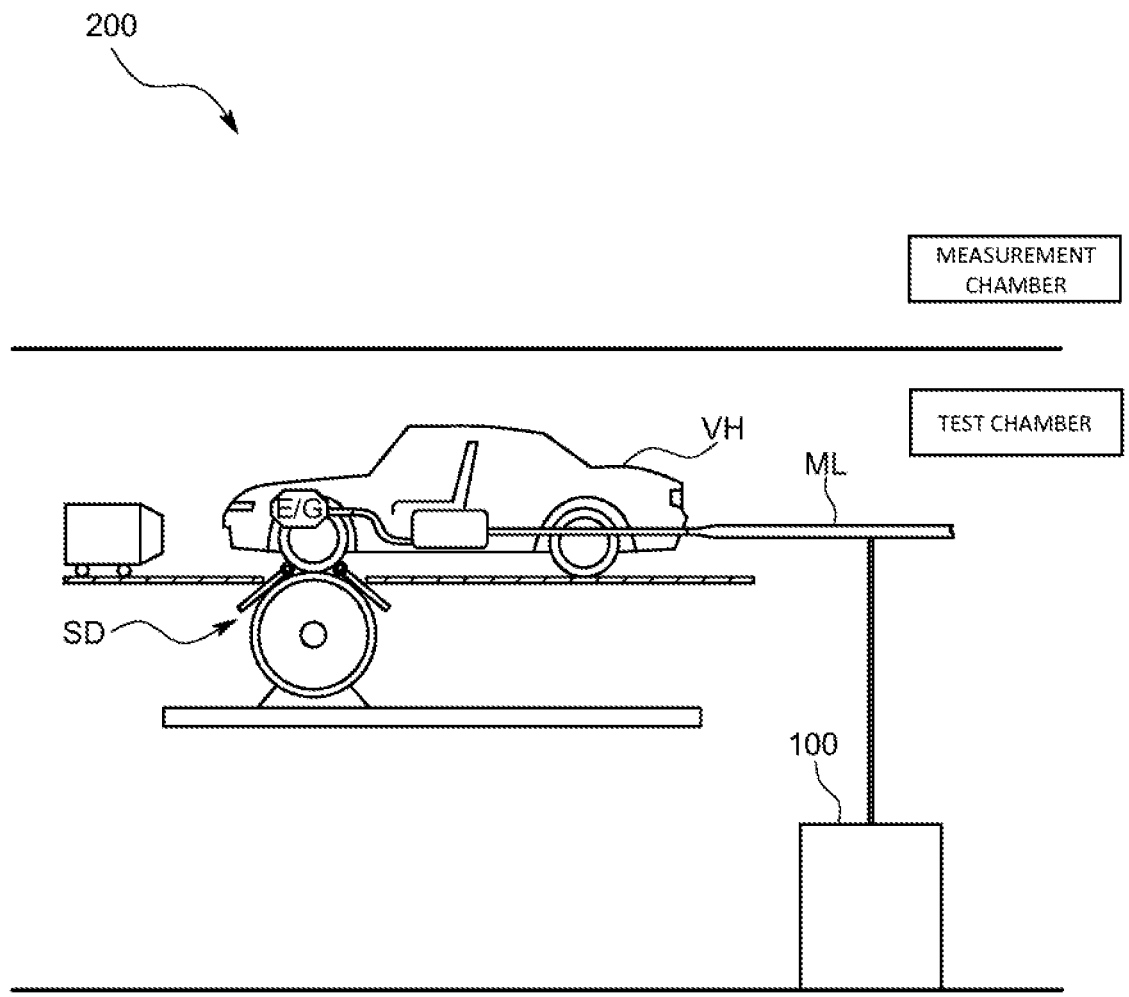
FIG. 1 is a schematic diagram illustrating an exhaust gas analysis apparatus according to a first embodiment of the present invention and a vehicle running test system.

The chassis dynamometer SD is, for example, a uniaxial one, and includes: a dynamometer main body having a rotating drum to be mounted with the drive wheels of the vehicle VH, and the like; and a dynamometer control device that controls the drum to give a running load similar to that on a road to the vehicle VH. The dynamometer control device SD is configured using, for example, a computer including a CPU, a memory, and the like, and has a function capable of mutually communicating a control signal, data, and the like with the outside. Further, it goes without saying that although FIG. 1 illustrates the chassis dynamometer for 2WD and FF vehicles, the chassis dynamometer may be one having paired rotating drums at the front and back to be able to respond to 4WD vehicles, or a biaxial one.

In addition, in the first embodiment, the exhaust gas analysis apparatus 100 is fixed in the test chamber in order to perform the exhaust gas analysis of the vehicle VH running on the chassis dynamometer SD. However, the exhaust gas analysis apparatus 100 can also be mounted in a vehicle running on a road, and in doing so, can also measure PM contained in exhaust gas discharged from an internal combustion engine during an actual on-road run.

Figure 2:
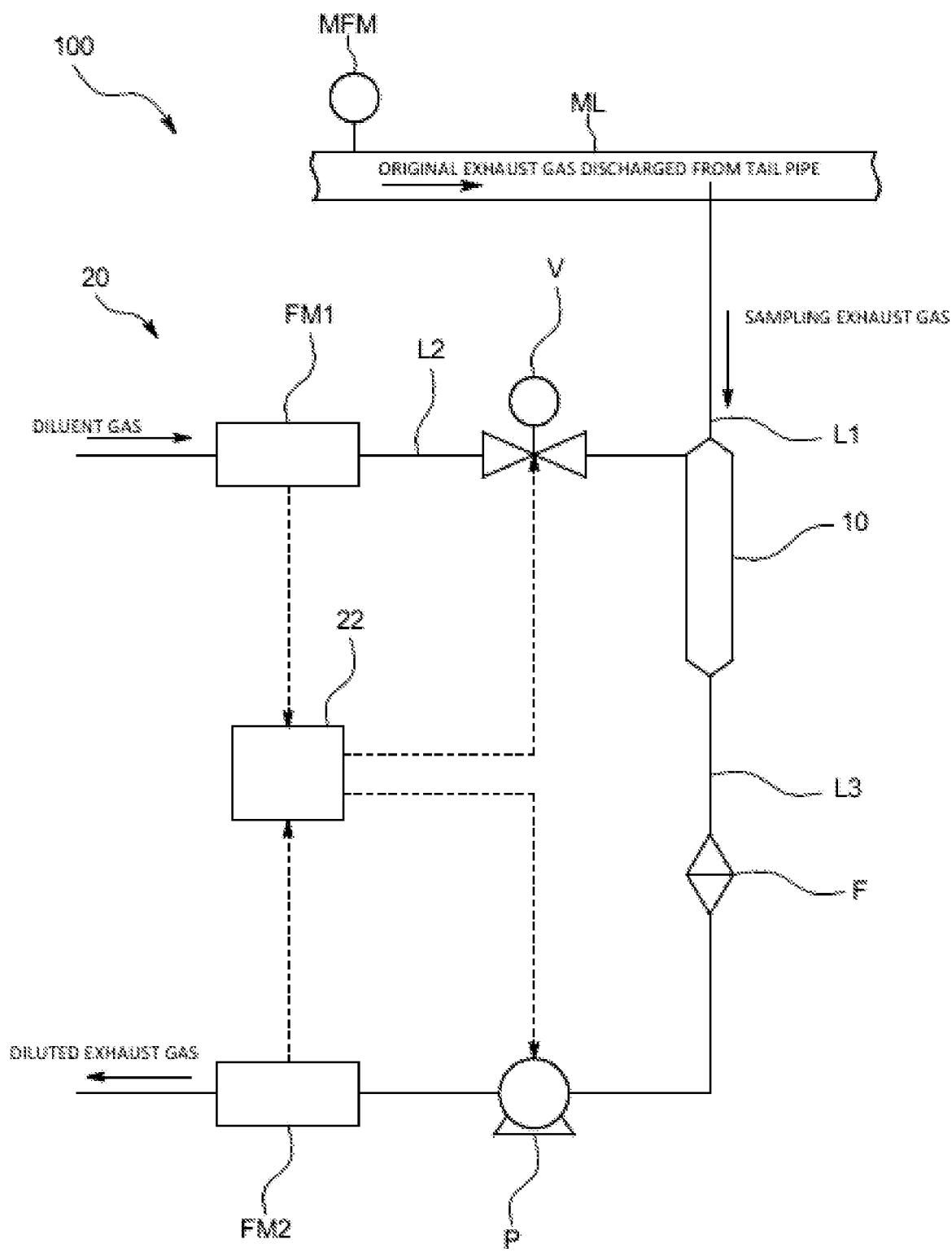
FIG. 2 is a schematic diagram illustrating the exhaust gas analysis apparatus according to the first embodiment.

Specifically, as illustrated in FIG. 2, the exhaust gas analysis apparatus 100 is one including: a main flow path ML through which original exhaust gas as exhaust gas discharged from the internal combustion engine flows; a sampling flow path L1 through which sampling exhaust gas into which the original exhaust gas flowing through the main flow path ML is partially split flows; a diluent gas supply path L2 through which diluent gas for diluting the sampling exhaust gas flows; a dilution tunnel 10 connected with the sampling flow path L1 and the diluent gas supply path L2;

a diluted exhaust gas flow path L3 through which diluted exhaust gas produced in the dilution tunnel 10 flows; and a split flow ratio control mechanism 20 configured to, depending on test conditions to be set, change a split flow ratio that is the ratio between the total flow rate of the original exhaust gas and the split flow rate of the sampling exhaust gas.

The sampling flow path L1 is one for, from the main flow path ML connected to a tail pipe of the vehicle VH, splitting the exhaust gas discharged from the internal combustion engine to sample part of the exhaust gas, and introducing the sampled exhaust gas to the diluted exhaust gas flow path L3 through the dilution tunnel 10. That is, the first embodiment is configured to split the original exhaust gas as the raw exhaust gas flowing through the main flow path ML at a predetermined ratio and flow the part of the original exhaust gas through the sampling flow path L1.

The diluent gas supply path L2 is one for introducing the diluent gas to the dilution tunnel 10, whose one end is connected to an unillustrated diluent gas source and whose other end is connected to the dilution tunnel 10. That is, the diluent gas supply path L2 is one for supplying the diluent gas to the diluted exhaust gas flow path L3 through the dilution tunnel 10. In addition, in the first embodiment, the diluent gas is air.

The dilution tunnel 10 is one for diluting the exhaust gas at a predetermined dilution ratio to produce the diluted exhaust gas, and here a so-called micro-tunnel. Note that the dilution tunnel 10 may be a so-called full-tunnel to be introduced with the total amount of the exhaust gas discharged from the internal combustion engine.

The diluted exhaust gas flow path L3 is one whose start point is connected to the dilution tunnel 10 and through which the diluted exhaust gas flows. The diluted exhaust flow path L3 is provided with, for example, one sheet of filter F as a collection part, and configured so that the filter F collects PM contained in the diluted exhaust gas. In addition, the end point of the diluted exhaust gas flow path L3 may be opened to the atmosphere or connected to various exhaust gas analyzers. Note that the filter F is not replaced even when the below-described phase interval in the driving mode is changed, but continuously used.

The split flow ratio control mechanism 20 is one that controls the flow rates of the above-described diluent gas and diluted exhaust gas, and thereby controls the split flow ratio that is the ratio of the split flow rate of the sampling exhaust gas to the total flow rate of the original exhaust gas. That is, given that the total flow rate of the original exhaust gas is denoted by $Q_M$ and the split flow rate of the sampling exhaust gas is denoted by $Q_d$, the split flow ratio r has a value represented by $r=Q_M/Q_d$. In addition, when the split flow ratio is changed, the dilution ratio applied of the diluted exhaust gas passing through the filter F is also changed. Here, the dilution ratio is the ratio between the split flow rate of the sampling exhaust gas and the flow rate of the diluent gas.

The split flow ratio control mechanism 20 includes: a main flowmeter MFM provided in the main flow path ML; a first flowmeter FM1 and a flow rate control valve V provided in the diluent gas supply path L2; a second flowmeter FM2 and suction pump P (e.g., a Roots blower) whose suction capability can be changed by rotation speed control, which are provided on the downstream side of the filter F in the diluted exhaust gas flow path L3; and a control device 22 for controlling the flow rate control valve V and the suction pump P. Note that the first flowmeter FM1 and the second flowmeter FM2 in the first embodiment are both venturi flowmeters.

The control device 22 is one physically including a CPU, a memory, an A/D converter, a D/A converter, and the like. In addition, the CPU and its peripheral devices cooperate in accordance with a program stored in a predetermined area of the memory, and thereby the control device 22 functions so as to acquire flow rate signals indicating the measured values of the respective flowmeters FM1 and FM2, as well as control the flow rate control valve V and the suction pump P on the basis of the flow rate signals.

Figure 3:
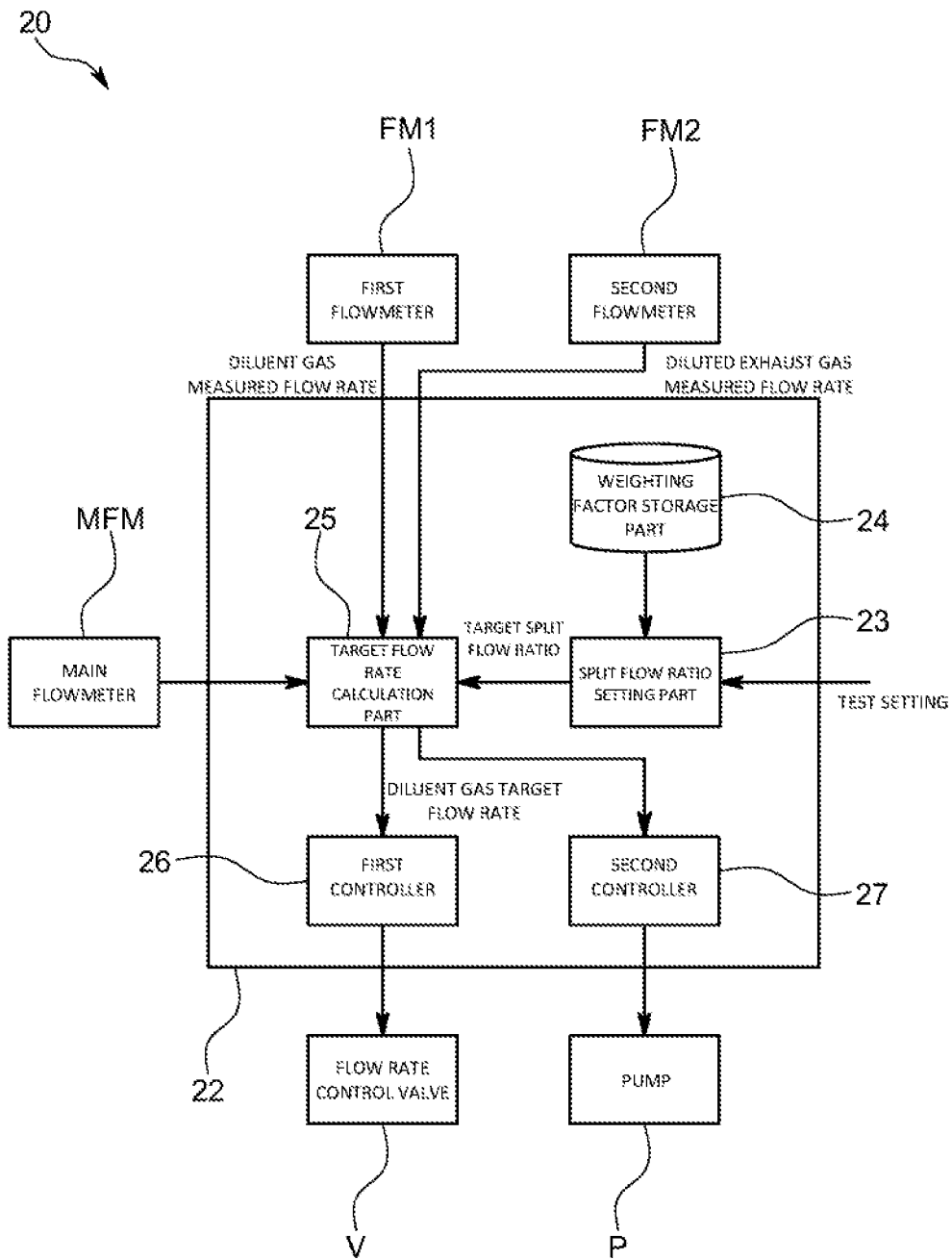
FIG. 3 is a functional block diagram illustrating the configuration of a split flow ratio control mechanism in the first embodiment.

Specifically, as illustrated in FIG. 3, the control device 22 fulfills functions as at least a split flow ratio setting part 23, a weighting factor storage part 24, a target flow rate calculation part 25, a first controller 26, and a second controller 27. The functions of the respective parts will be described below.

When an operator provides a test start input or the like, the split flow ratio setting part 23 refers to the weighting factor storage part 24 to set target split flow ratios based on weighting factors determined depending on the contents of the test in the target flow rate calculation part 25. In the first embodiment, target split flow ratios corresponding to the below-described respective phase intervals in the driving mode are set in the target flow rate calculation part 25.

The weighting factor storage part 24 stores test condition data indicating the test conditions and corresponding split flow ratio data. Here, the test conditions refer to test conditions stipulated in predetermined regulations such as regulations or exhaust gas measurement regulations, test conditions arbitrarily set by an operator, or such other test conditions. As the test conditions, the driving mode stipulating, for example, what speeds the vehicle VH should be operated at on the chassis dynamometer SD is stored in the weighting factor storage part 24. Also, weighting factors for weighting test results in the respective phase intervals constituting the driving mode are stored in the weighting factor storage part 24. The driving mode and the weighting factors are stipulated in, for example, regulations (such as CFR 1066) as the predetermined regulations.

Figure 4:
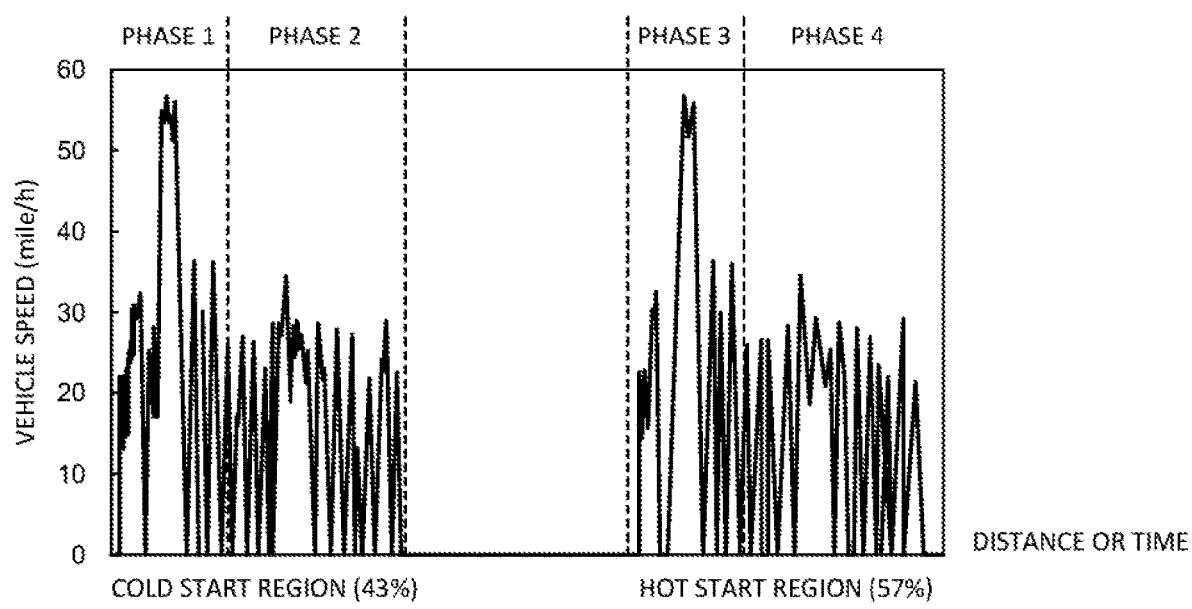
FIG. 4 is a schematic diagram illustrating an example of test conditions in the first embodiment.

That is, the weighting factor storage part 24 stores the driving mode as illustrated in FIG. 4 and the weighting factors predetermined corresponding to the respective phase intervals constituting the driving mode as the test condition data. In the first embodiment, as the test condition data, the driving mode constituted by the four phase intervals is stored, and the vehicle VH is driven so as to achieve vehicle speeds as illustrated in the graph of FIG. 4, and the particulate matter in the exhaust gas discharged from the internal combustion engine during the driving is evaluated and analyzed.

The driving mode is constituted by the four phase intervals, i.e., Phases 1 to 4. That is, the first half of the driving mode corresponds to a cold state region based on a cold start, in which the vehicle is started from a state of being not sufficiently warmed up, and is constituted by Phase 1 corresponding to the first half in which variations in vehicle speed are large and Phase 2 corresponding to the second half in which variations in vehicle speed are small as compared with Phase 1.

On the other hand, the second half of the driving mode corresponds to a hot start region based on a hot start, in which the vehicle is started from a state of being warmed up, and is constituted by Phase 3 corresponding to the first half in which variations in vehicle speed is large and Phase 4 corresponding to the second half in which variations in vehicle speed is small as compared with Phase 3.

In the first embodiment, a weighting factor is not set for each phase, but collectively set for each of the cold and hot start regions each constituted by the multiple phases. That is, the weighting factors for the cold and hot start regions are stipulated by the regulations so as to meet, for example, a:(1−a). In the first embodiment, the weighting factor for the cold start region is set to 43%, and that for the hot start region is set to 57%.

In the first embodiment, the split flow ratio setting part 23 acquires the weighting factors set for the cold and hot start regions from the weighting factor storage part 24, and sets the target split flow ratios in the target flow rate calculation part 25 so that 1/a:1/(1−a) as the inverse ratio between the weighting factors when performing the test in the respective regions can be obtained. In the first embodiment, the split flow ratio setting part 23 sets the target split flow ratios in the target flow rate calculation part 25 using, for example, the inverses of the weighting factors stipulated in the predetermined regulations so that the relationship of [a split flow ratio in the cold start region: a split ratio in the hot start region=2.32:1.75] can be obtained. Note that as a split flow ratio, for example, a predetermined stipulated split flow ratio R is set, and the values of the split flow ratios to be set are 2.32R for the cold start region, and 1.75R for the hot start region. When such target split flow ratios are obtained, the flow rate of the sampling exhaust gas passing through the filter F becomes one reflecting a weighting factor stipulated by the predetermined regulations for each of the regions.

As illustrated in FIG. 3, the target flow rate calculation part 25 calculates the target flow rate of the diluent gas flowing through the diluent gas supply path L2 necessary to obtain each of the target split flow ratios set by the split flow ratio setting part 23. More specifically, on the basis of each of the target split flow ratios set by the split flow ratio setting part 23, the total flow rate of the original exhaust gas measured by the main flowmeter MFM, and the flow rate of the diluted exhaust gas flowing through the diluted exhaust gas flow path L3 measured by the second flowmeter FM2, the target flow rate calculation part 25 calculates, as the target flow rate, the flow rate of the diluent gas to be flowed through the diluent gas supply path L2. First, the target flow rate calculation part 25 divides the total flow rate of the original exhaust gas by the target split flow ratio to thereby calculate the split flow rate of the sampling exhaust gas to be obtained.

That is, in the cold start region, the split flow rate of the sampling exhaust gas to be obtained has a value resulting from dividing the total flow rate of the original exhaust gas by 2.32R (value resulting from multiplying the total flow rate of the original exhaust gas by 0.43/R), whereas in the hot start region, the split flow rate of the sampling exhaust gas to be obtained has a value resulting from dividing the total flow rate of the original exhaust gas by 1.75R (value resulting from multiplying the total flow rate of the original exhaust gas by 0.57/R).

In addition, the target flow rate calculation part 25 may calculate, as the target flow rate of the diluent gas to be flowed through the diluent gas supply path L2, a differential flow rate resulting from subtracting the split flow rate of the sampling exhaust gas to be obtained from the current measured flow rate of the diluted exhaust gas being measured by the second flowmeter FM2.

Further, the target flow rate of the diluent gas is set in the first controller 26. In addition, the target flow rate calculation part 25 also sets the total flow rate (target flow rate) of the diluted exhaust gas to be flowed through the diluted exhaust gas flow path L3 in the second controller 27 in accordance with test settings.

The first controller 26 performs flow rate feedback control of the flow rate control valve V so that the deviations between the target flow rate of the diluent gas calculated by the target flow rate calculation part 25 and the measured flow rate of the diluent gas measured by the first flowmeter FM1 decreases. Note that the target flow rate calculation part 25 updates the target flow rate of the diluent gas on a control period basis. Accordingly, even when the flow rate of the original exhaust gas discharged from the internal combustion engine changes, the flow rate of the diluent gas is changed and thereby the specific split flow ratio can be kept constant in each of the cold start region and the hot start region.

The second controller 27 is one that controls an operation state of the pump P, and in the first embodiment, performs the control so that the flow rate of the diluted exhaust gas flowing through the diluted exhaust gas flow path L3 becomes constant at the total target flow rate of the diluted exhaust gas set by the target flow rate calculation part 25. The total target flow rate of the diluted exhaust gas set in the second controller 27 is not one successively updated but kept constant at the value set by the target flow rate calculation part 25.

When viewed from the dilution tunnel 10, the flow rate of the diluent gas as one input and the flow rate of the diluted exhaust gas as an output are controlled, and therefore the flow rate of the exhaust gas flowing through the sampling flow path L1 as the other input is ideally kept at the differential flow rate between the flow rate of the diluted exhaust gas and the flow rate of the diluent gas.

Figure 5:
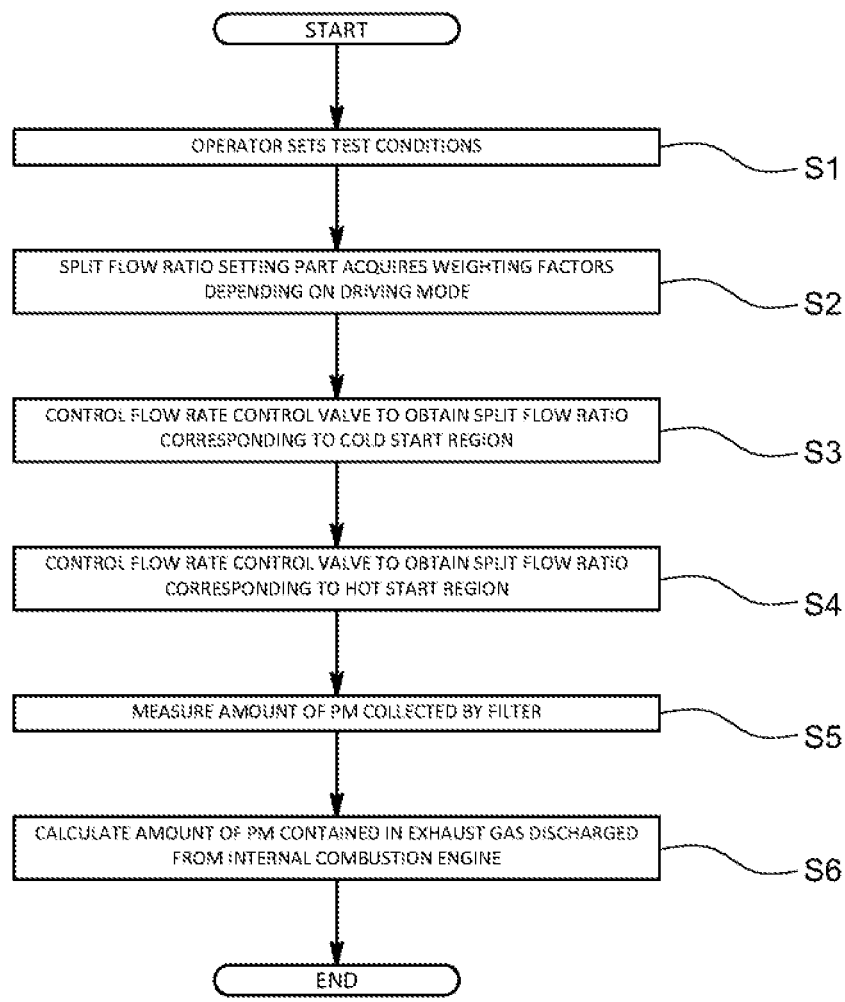
FIG. 5 is a flowchart illustrating a procedure for analyzing particulate matter using the exhaust gas analysis apparatus in the first embodiment.

A procedure for analyzing particulate matter by the exhaust gas analysis apparatus of the first embodiment configured as described above will be described with reference to a flowchart of FIG. 5.

First, regarding what kind of test is performed, an operator sets the test conditions in the control device 22 (Step S1).

Then, the split flow ratio setting part 23 acquires the test condition data and the weighting factors from the weighting factor storage part 24, and in the target flow rate calculation part 25, sets the target split flow ratios corresponding to the weighting factors set for the respective regions in the driving mode of the test to be performed (Step S2).

That is, the first controller 26 controls the flow rate control valve V so as to obtain 2.32R as the target split flow ratio corresponding to the weighting factor set for the cold start region. Specifically, the flow rate feedback control adapted to set, as the target flow rate of the diluent gas, a flow rate obtained by subtracting a value resulting from dividing the current total flow rate of the original exhaust gas measured by the main flowmeter MFM by 2.32R from the current measured flow rate of the diluted exhaust gas measured by the second flowmeter FM2 is continued (Step S3).

Further, the test proceeds, and before performing the test in the hot start region, the split flow ratio setting part changes the target split flow ratio to 1.75R that is a value corresponding to the hot start region. The first controller 26 controls the flow rate control valve V so as to obtain the target flow rate of the diluent gas corresponding to the changed target split flow ratio. Specifically, the flow rate feedback control adapted to set, as the target flow rate of the diluent gas, a flow rate obtained by subtracting a value resulting from dividing the current total flow rate of the original exhaust gas measured by the main flowmeter MFM by 1.75R from the current measured flow rate of the diluted exhaust gas measured by the second flowmeter FM2 is continued (Step S4).

Note that in Steps S3 and S4, the second controller 27 continues the control so that the flow rate of the diluted exhaust gas is kept constant by the pump P. Also, the diluted exhaust gas passes through the filter F common to both Steps S3 and S4.

When the test in the cold and hot start regions is finished, the filter F is detached, and the amount of collected PM and the like are analyzed by an analysis part (Step S5).

On the basis of a result obtained in Step S5, the amount of PM contained in the exhaust gas discharged from the internal combustion engine is calculated (Step S6).

The exhaust gas analysis apparatus 100 of the first embodiment configured as described above can reflect the weighting factors set for the respective regions by, without changing the flow rate of the diluted exhaust gas passing through the filter F, changing the flow rate of the diluent gas in accordance with the driving mode stipulated in the predetermined regulations to change the split flow ratio, and increasing/decreasing the amount of the exhaust gas in the diluted exhaust gas passing through the filter F. Accordingly, it is not necessary to replace the filter when the driving mode of the vehicle VH changes from the cold start region to the hot start region, and therefore time and effort necessary for the replacement and the like can be omitted. Also, even when the amount of the particulate matter discharged from the internal combustion engine is small, an amount enough to ensure measurement accuracy can be collected by the filter F for the analysis.

In addition, since it is not necessary to increase/decrease the total flow rate of the diluted exhaust gas passing through the filter F, an error due to response delay is less likely to occur.

Further, before passing through the filter F, the flow rate can be changed, and therefore as compared with when changing the total flow rate of the diluted exhaust gas passing through the filter F, followability is good. Accordingly, when the test switches from the cold start region to the hot start region, the flow rate of the exhaust gas in the diluted exhaust gas can be changed to have a value corresponding to the weighting factor and the like set for each of the driving mode.

Still further, since the flow rate of the diluted exhaust gas whose flow rate is larger than those of the diluent gas and exhaust gas is kept constant by the pump P, for example, the second flowmeter FM2 for measuring the flow rate of the diluted exhaust gas is not required to be one having a wide range and high accuracy.

In addition, since the exhaust gas analysis apparatus 100 of the first embodiment can be mounted in a vehicle running on a road, an actual on-road test can be performed in compliance with regulations in one run without replacing the filter F.

Variations of the first embodiment will be described. As the configuration of the driving mode, weighting factors, split flow ratios are not limited to those described above, but can be variously changed. For example, the driving mode may be constituted by Phases 1 to 3, in which the ratio among weighting factors set for the respective phase intervals meets the relationship of [a weighting factor in Phase 1: a weighting factor in Phase 2: a weighting factor in Phase 3=0.43:1:0.57]. In this case, the ratio among split flow ratios set for the respective phase intervals may be the inverse ratio among the weighting factors. Specifically, it is only necessary to be [a split flow ratio set for Phase 1: a split flow ratio set for Phase 2: a split flow ratio set for Phase 3=2.32:1: 1.75].

Also, the driving mode may be one constituted by Phases 1 to 4, in which weighting factors are set for the respective phase intervals. Specifically, it may be possible to be [a weighting factor in Phase 1: a weighting factor in Phase 2: a weighting factor in Phase 3: a weighting factor in Phase 4=0.754:0.754:1:1]. In addition, in this case, it is only necessary that the ratio among split flow ratios set for the respective phase intervals is 1.32:1.32:1:1.

Next, a second embodiment of the present invention will be described with reference to FIGS. 6 to 9.

Figure 6:
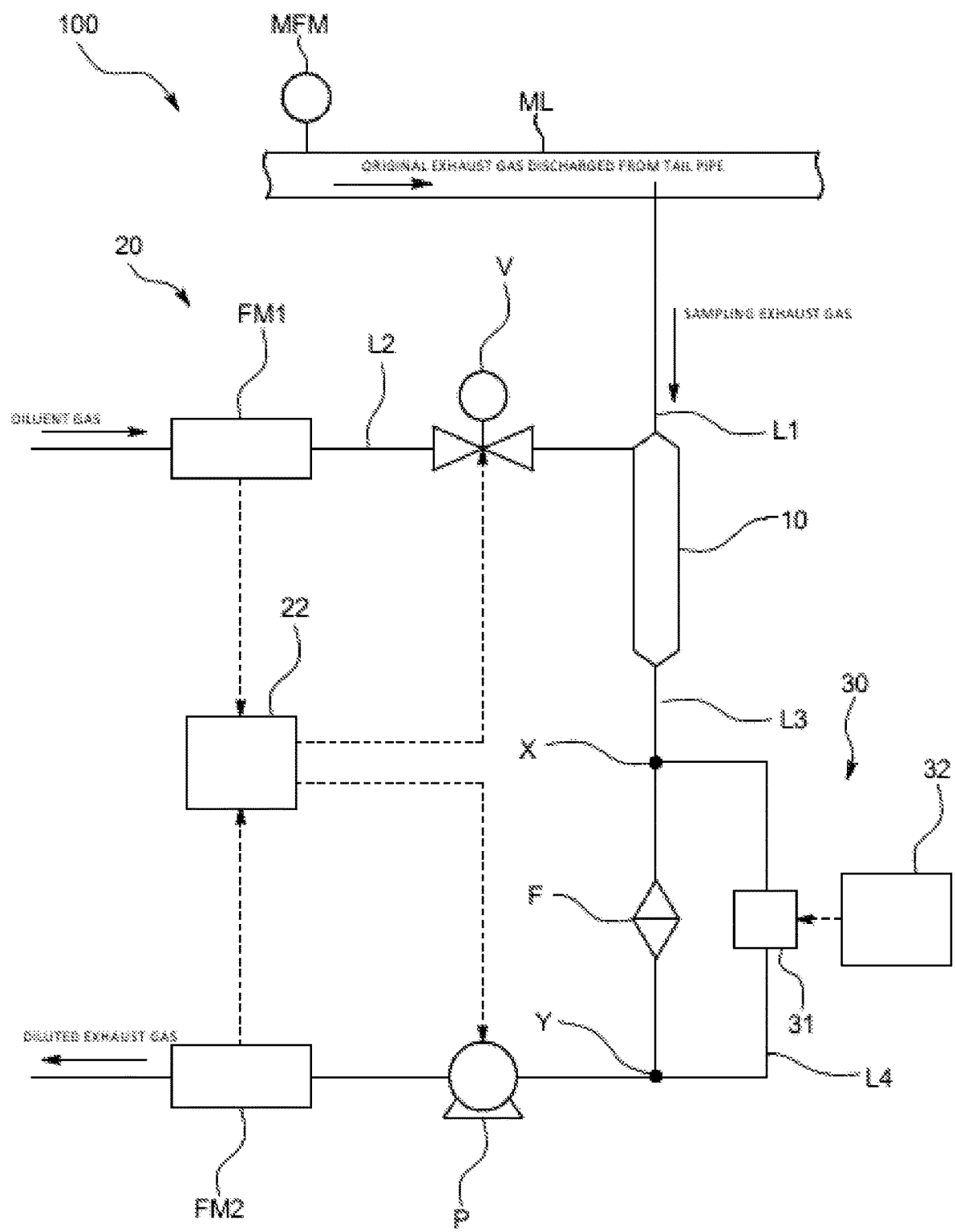
FIG. 6 is a schematic diagram illustrating an exhaust gas analysis apparatus according to a second embodiment of the present invention.

As illustrated in FIG. 6, an exhaust gas analysis apparatus 100 of the second embodiment is adapted to further include: a bypass flow path L4 that, in the diluted exhaust gas flow path L3, branches from the upper stream of the filter F and merges with the lower stream of the filter F; and a bypass flow rate control part 30 that controls a bypass flow rate through the bypass flow path L4 while flowing the diluted exhaust gas to the filter F.

That is, the second embodiment is configured not to change the split flow ratio so as to correspond to weighting in each driving mode, but to be able to obtain the flow rate of the diluted exhaust gas passing through the filter F, which corresponds to weighting in each driving mode, by increasing/decreasing the flow rate of the diluted exhaust gas bypassed through the bypass flow path L4.

The bypass flow path L4 is one for bypassing the filter F without flowing part of the diluted exhaust gas through the filter F, and branches from a branching point between the dilution tunnel 10 and the filter F and merges with a merging point between the filter F and the suction pump P. Meanwhile, if the merging point Y of the bypass flow path L4 is provided on the downstream side of the suction pump P, in order to introduce the part of the diluted exhaust gas to the bypass flow path, a suction pump has to be separately provided in the bypass flow path L4 or on the lower stream side than the merging point Y. In contrast, in the present embodiment, since the merging point Y is provided between the filter F and the suction pump P, i.e., on the upstream side of the suction pump P as described above, the part of the diluted exhaust gas can be introduced to the bypass flow path L4 by the difference in pressure between the branching point X and the merging point Y without separately providing a suction pump in the bypass flow path L4 or the like.

The bypass flow rate control mechanism 30 is one that controls the bypass flow rate through the bypass flow path L4 in order to change the flow rate of the diluted exhaust gas flowing through the filter F, and includes: a mass flow controller 31 provided in the bypass flow path L4; and a control part main body 32 for controlling the mass flow controller 31.

Note that although the mass flow controller 31 in the present embodiment is of a differential pressure type, a mass flow controller of a thermal type may be used.

Figure 7:
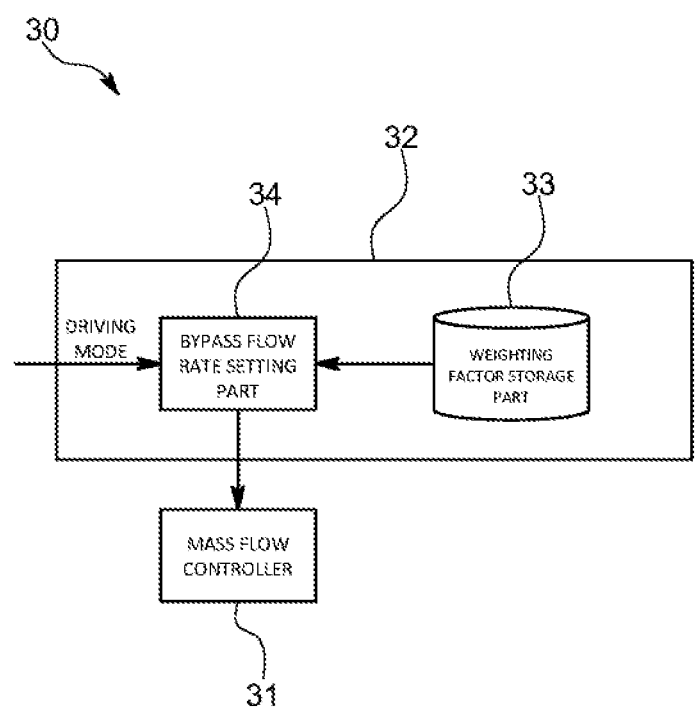
FIG. 7 is a functional block diagram illustrating the configuration of a split flow rate control mechanism in the second embodiment.

The control part main body 32 is one physically including a CPU, a memory, an A/D converter, a D/A converter, and the like, and as illustrated in FIG. 7, configured to fulfill functions as a weighting factor storage part 33 and a bypass flow rate setting part 34 in such a manner that the CPU and its peripheral devices cooperate in accordance with a program stored in a predetermined area of the memory.

As illustrated in FIG. 7, the weighting factor storage part 33 is set in a predetermined area of the memory, and stores test condition data indicating test conditions preset in order to obtain test results. The test conditions here refer to test conditions stipulated in regulations, exhaust gas measurement regulations, or the like, test conditions arbitrarily set by an operator, or such other test conditions, and the weighting factor storage part 33 in the present embodiment stores multiple pieces of test condition data.

The weighting factor storage part 33 in the present embodiment stores multiple driving modes each indicating a vehicle running state, and flow rate conditions on the flow rates of the diluted exhaust gas to be flowed through the filter F in the respective driving modes in association with each other.

Each of the flow rate conditions refers to a weighting factor set for PM mass measured in each of the phases in order to obtain one test result, and here to a weighting factor stipulated in, for example, regulations (such as CFR 1066)

That is, the weighting factor storage part 33 stores a driving mode and weighting factors predetermined corresponding to respective phase intervals in the driving mode in association with each other.

More specifically, as illustrated in FIG. 8, the driving mode is constituted by three phase intervals, and vehicle speeds and the like in the respective phase intervals and weighting factors corresponding to the phase intervals are stored in association with each other as one piece of test condition data. For example, weighting factors in Phases 1 and 2 constituting a cold start region are set to 43% and 100%, respectively, and a weighting factor in Phase 3 constituting a hot start region is set to 57%. In the second embodiment, as stipulated in predetermined regulations, the weighting factors when omitting the test in Phase 4 are set for the respective phase intervals As illustrated in FIG. 7, the bypass flow rate setting part 34 is one that from the weighting factor storage part 33, acquires test condition data indicating test conditions selected, for example, using input means by an operator, as well as on the basis of the test condition data, controls the bypass flow rate.

In more detail, the bypass flow rate setting part 34 transmits a control signal to an unillustrated flow rate control valve of the mass flow controller 31 provided in the bypass flow path L4 so that the flow rate of the diluted exhaust gas passing through the filter F in each phase interval becomes equal to a flow rate resulting from multiplying a predetermined reference flow rate by a weighting factor corresponding to the phase interval.

More specifically, the bypass flow rate setting part 34 transmits the control signal so that the ratio among the flow rates of the diluted exhaust gas flowing through the filter F, i.e., the ratio among a first flow rate in Phase 1, a second flow rate in Phase 2, and a third flow rate in Phase 3 becomes equal to the ratio among the above-described weighting factors, i.e., 0.43:1:0.57.

Figure 9:
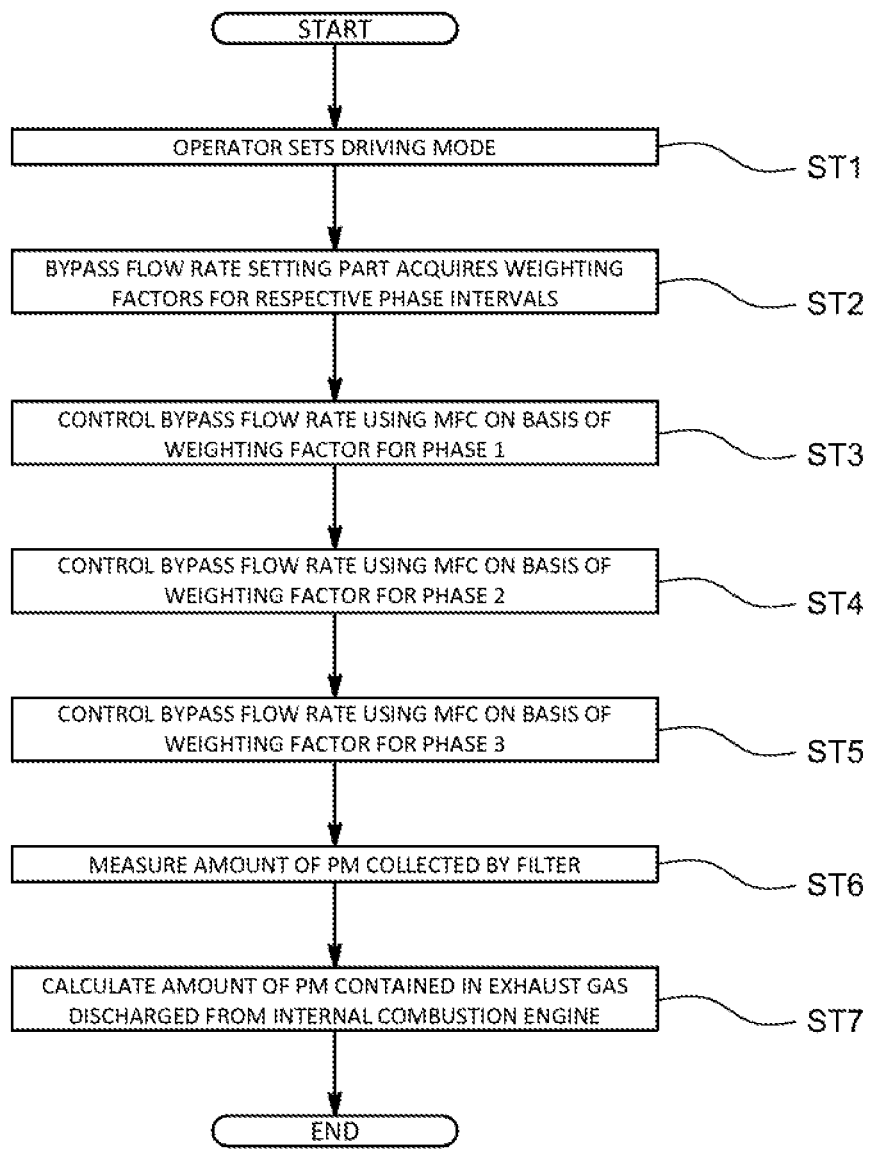
FIG. 9 is a flowchart illustrating a procedure for analyzing particulate matter using the exhaust gas analysis apparatus in the second embodiment.

The exhaust gas analysis apparatus 100 of the present embodiment configured as described above operates in accordance with, for example, Steps ST1 to ST7 as in a flowchart illustrated in FIG. 9. As can be seen when comparing FIG. 5 illustrating the operation of the first embodiment and FIG. 9, the operations in Steps S2 to S4 describing the change in split flow ratio in FIG. 5 correspond to the operations in Steps ST2 to ST5 describing the change in bypass flow rate in the second embodiment.

Specifically, first, regarding what kind of test is performed, an operator sets the test condition in the control part main body 32 (Step ST1).

Then, the bypass flow rate setting part 34 acquires the test condition data and bypass ratio data from the weighting factor storage part 33 (Step ST2).

That is, a target bypass flow rate is set in the mass flow controller 31 so that the diluted exhaust gas flows through the filter F at a ratio of 0.43 that is a value corresponding to the weighting factor set for Phase 1. In this example, the flow rate of the diluted exhaust gas flowing through the filter F only has to be 0.43 of the total flow rate of the diluted exhaust gas, and therefore, as the target bypass flow rate, the bypass flow rate setting part 34 sets, in the mass flow controller 31, a value resulting from multiplying the total flow rate of the diluted exhaust gas achieved by the pump P by 0.57 (Step ST3).

In Phase 2, the target bypass ratio only has to be 1 as compared with that in Phase 1, and therefore it is only necessary that the total amount of the diluted exhaust gas flows through the filter F. Accordingly, as the target bypass flow rate, the bypass flow rate setting part 34 sets zero in the mass flow controller 31, and a fully closed state is kept, i.e., a state where no diluted exhaust gas flows through the bypass flow rate L4 is kept (Step ST4).

Further, in Phase 3, the target bypass flow rate is set in the mass flow controller 31 so that the diluted exhaust gas flows through the filter F at a target bypass ratio of 0.57 corresponding to the weighting factor set for Phase 3. In this example, the flow rate of the diluted exhaust gas flowing through the filter F only has to be 0.57 of the total flow rate, and therefore as the target bypass flow rate, the bypass flow rate setting part 34 sets, in the mass flow controller 31, a value resulting from multiplying the total flow rate of the diluted exhaust gas achieved by the pump P by 0.43 (Step ST5).

Still further, the test proceeds, and before performing the test in the hot start region, the bypass flow rate setting part 23 change the target bypass ratio to 0.57 that is a value corresponding to the hot start region. The first controller 26 continues to control the flow rate control valve V so as to obtain a target flow rate of the diluent gas corresponding to the changed target bypass ratio (Step S4).

Note that in Steps S3 and S4, the second controller 27 continues the control so that the flow rate of the diluted exhaust gas is kept constant by the pump P. Also, the diluted exhaust gas passes through the filter F common to both Steps S3 and S4.

When the test in Phases 1 to 3 is finished, the filter F is detached, and the amount of collected PM and the like are measured by a separate measurement instrument (Step ST6).

On the basis of a result obtained in Step ST6, the amount of PM contained in the exhaust gas discharged from the internal combustion engine is calculated (Step ST7).

Figure 10:
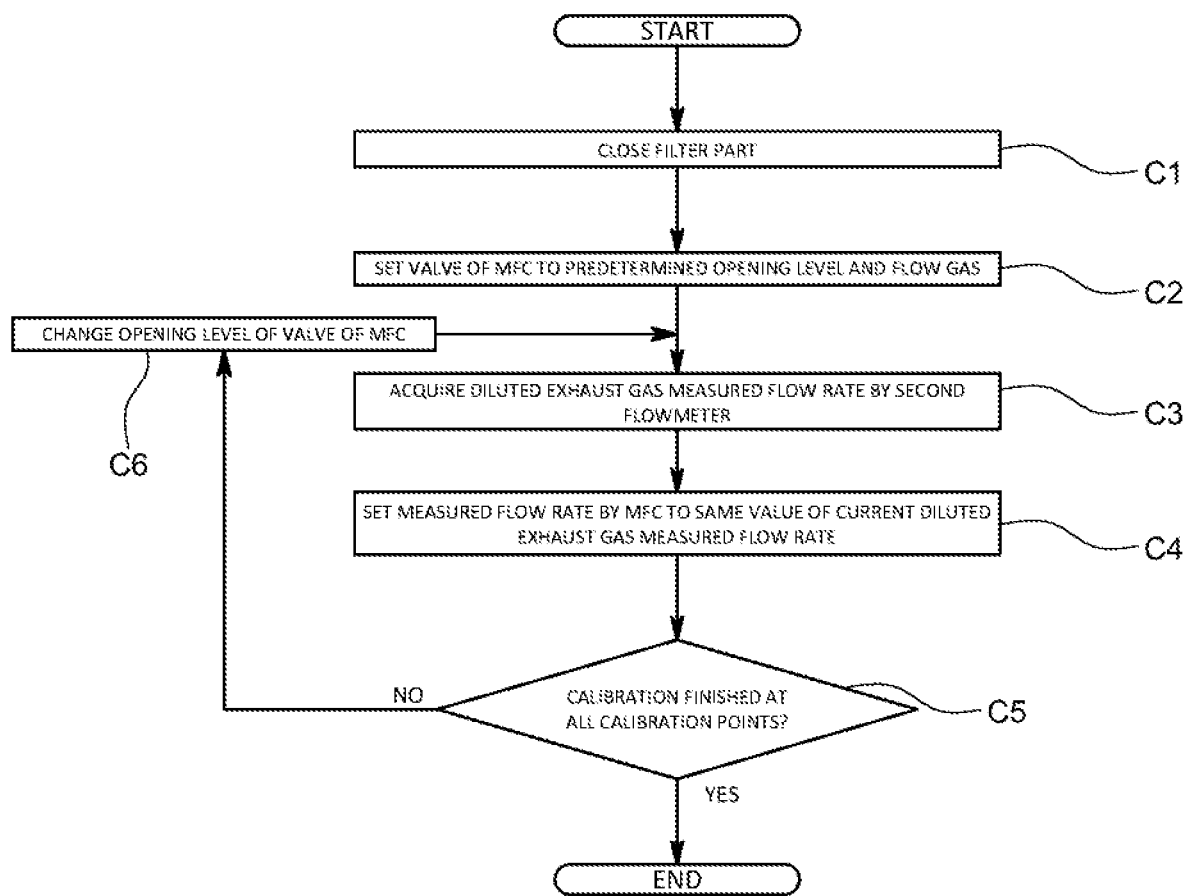
FIG. 10 is a flowchart illustrating a calibration procedure for the exhaust gas analysis apparatus in the second embodiment.

Next, a calibration method for the mass flow controller 31 in the second embodiment configured as described above will be described with reference to FIG. 10.

First, a part where the filter F is provided in the diluted exhaust gas flow path L3 is closed, and setting is performed so that fluid flows only through the bypass flow path L4 (Step C1).

Then, the opening level of a valve (not illustrated) of the mass flow controller 31 is fixed to a predetermined opening level, and gas is flowed through the bypass flow path L4 and the diluted exhaust gas flow path L3 after the merging point (Step C2).

Subsequently, the measured flow rate of the diluted exhaust gas measured by the second flowmeter FM2 is acquired (Step C3), and with a value indicated by the second flowmeter FM2 as a reference, the value of a flowmeter of the mass flow controller 31 is set to the same value of the second flowmeter FM2 (Step C4).

When the flowmeter (not illustrated) of the mass flow controller 31 is not calibrated at all calibration points (Step C5), an opening level of the valve of the mass flow controller 31 is changed (Step C6), and Steps C3 to C5 are repeated until calibration at all the calibration points is completed.

Calibrating in this manner makes it possible to substantially match the characteristics of the flowmeter of the mass flow controller 31 with the characteristics of the second flowmeter FM2. Accordingly, even if a measured value indicated by the second flowmeter FM2 deviates from an actual flow rate, relative relationship to the value of a flow rate measured by the mass flow controller 31 can be kept.

Accordingly, the accuracy of the ratio of the flow rate of the diluted exhaust gas bypassed through the bypass flow path L4 to the total flow rate of the diluted exhaust gas can be always ensured. For this reason, a split flow ratio corresponding to weighting to be achieved in each driving mode can be accurately obtained, and the measurement accuracy of, for example, PM or the like, can be improved.

Figure 11:
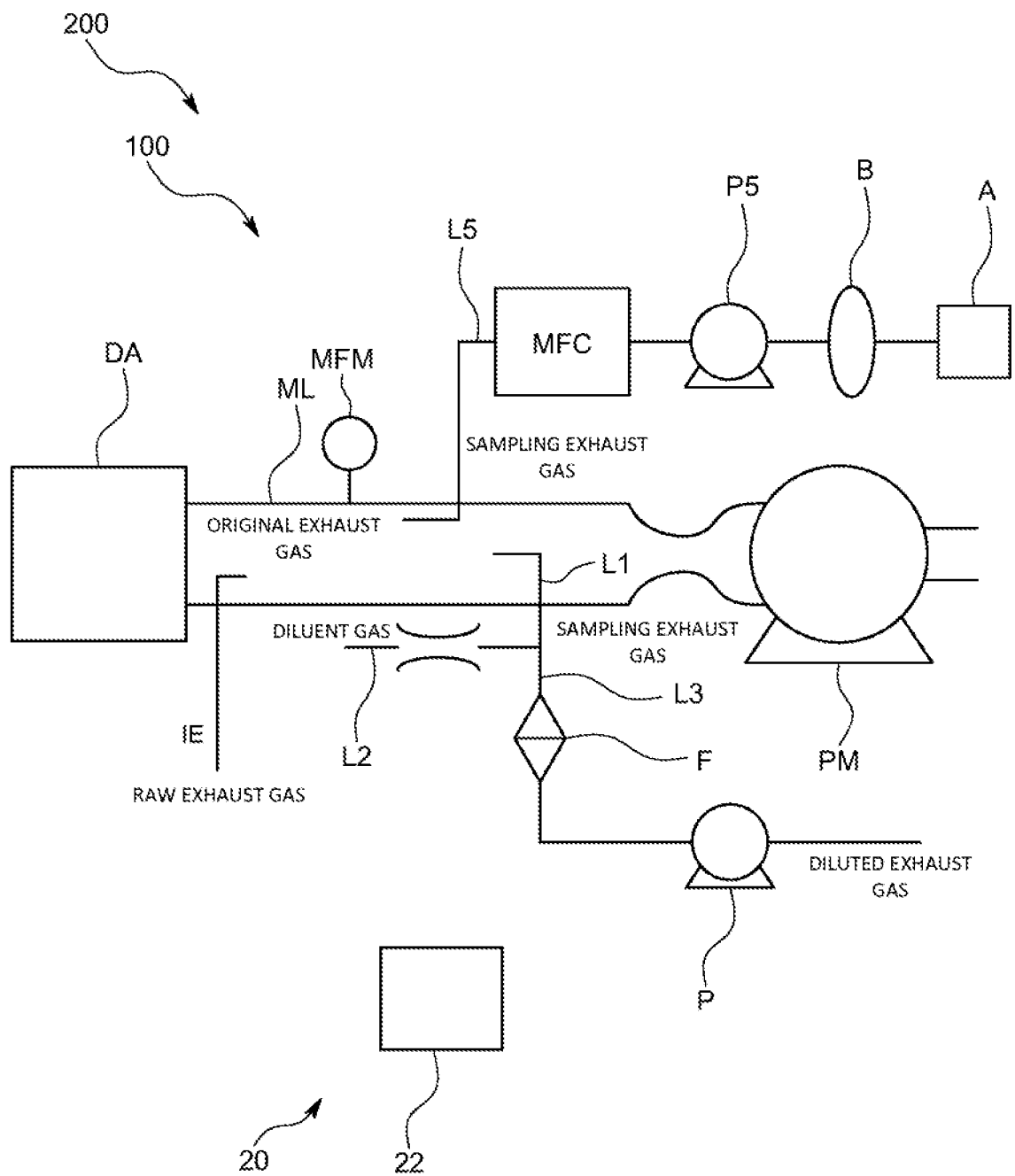
FIG. 11 is a schematic diagram illustrating an exhaust gas analysis apparatus according to a third embodiment of the present invention.

An exhaust gas analysis apparatus 100 according to a third embodiment of the present invention will be described with reference to FIG. 11. Note that members corresponding to those described in the first embodiment are denoted by the same reference signs.

The exhaust gas analysis apparatus 100 of the third embodiment is configured to sample exhaust gas from a main flow path ML constituting a so-called full tunnel introduced with the total amount of the exhaust gas discharged from an internal combustion engine, and change a dilution ratio to a value corresponding to a weighting factor in each of phase intervals constituting a driving mode. The exhaust gas analysis apparatus 100 further includes a bag line L5 for containing the total amount of exhaust gas discharged in each phase interval in an exhaust gas bag B in parallel in addition to a diluted exhaust gas flow path L3 provided with a filter F for collecting particulate matter. The measurement target component of the exhaust gas collected in the exhaust gas bag B is analyzed in an analysis part A provided in the subsequent state. Not only PM but also measurement target components such as CO, $CO_2$, and NOx can be measured using the exhaust gas collected in the exhaust gas bag B.

In addition, on the upstream side of the main flow path ML, a dilution air inflow port DA, and an introduction path IE for introducing the exhaust gas discharged from a tail pipe or the like of a vehicle into the main flow path ML are provided. Further, on the downstream side of the main flow path ML, a main pump PM is provided, and the exhaust gas is discharged from the main flow path ML at a constant flow rate. Note that although in the first embodiment, the original exhaust gas is the raw and undiluted exhaust, in the third embodiment, the original exhaust gas is the exhaust gas that is raw exhaust gas diluted with the dilution air flowing in from the inflow port DA First, a configuration for collecting particulate matter by the filter F is described.

In the third embodiment, a sampling flow path L1 is a part for splitting the original exhaust gas flowing through the main flow path ML to sample part of the original exhaust gas as sampling exhaust gas, and configured to be directly merged with a diluent gas supply path L2. A flow path after merger of the sampling flow path L1 and the diluent gas supply path L2 corresponds to the diluted exhaust gas flow path L3, and is provided with the filter F and a pump P.

As described in the first and second embodiments, the flow rate of the diluent gas supplied from the diluent gas supply path L2 is configured to be changed so as to obtain a dilution ratio corresponding to a weighting factor set for each region or each phase interval in predetermined regulations.

In the present embodiment, the total flow rate of the diluted exhaust gas flowing through the diluted exhaust gas flow path L3 is controlled to be constant by the pump P provided in the diluted exhaust gas flow path L3. For this reason, by changing the flow rate of the diluent gas supplied from the diluent gas supply path L2, the flow rate of the sampling exhaust gas splitting and sampled from the original exhaust gas in the main flow path ML and can be indirectly changed. That is, in the third embodiment, depending on a phase interval, a split flow ratio control mechanism 20 changes a split flow ratio that is the ratio between the total flow rate of the original exhaust gas and the split flow rate of the sampling exhaust gas. Note that the split flow ratio in the third embodiment is represented by [the total flow rate of the original exhaust gas (diluted raw exhaust gas)/the split flow rate of the sample exhaust gas flowing through the sampling flow path L1].

For example, when the ratio among weighting factors in Phases 1, 2, and 3 is set to 0.43:1:0.57, the flow rate of the diluent gas flowing through the diluent gas supply path L2 is controlled so that the ratio among split flow ratios in the respective phase intervals becomes 2.32:1:1.75.

In doing so, as with the first embodiment, measurement can be performed corresponding to the weighting factors set for the respective phase intervals, and particulate matter can be measured using the one filter F in accordance with regulations.

Next, a configuration for changing the flow rate of the exhaust gas to sample it when the exhaust gas is split and sampled into the exhaust gas bag B from the full tunnel ML through the bag flow path L5 in each phase interval is described.

The bag flow path L5 is provided with a mass flow controller MFC, a bag flow path pump P5, and the exhaust gas bag B from the upstream side. Note that the exhaust gas bag B corresponds to a collection part in claims.

The mass flow controller MFC is one that controls the flow rate of the sampling exhaust gas splitting and sampled from the original exhaust gas flowing through the main flow path ML in each phase interval so that the flow rate becomes equal to a flow rate corresponding to a weighting factor in the phase interval.

In the third embodiment, when the ratio among the weighting factors in Phases 1, 2 and 3 is 0.47:1:0.53, the ratio among target flow rates to be set in the mass flow controller MFC in the respective phases is also set to be 0.47:1:0.53. The exhaust gas sampled into the bag flow path L5 in each phase interval is directly contained without replacing the exhaust gas bag B.

In doing so, the exhaust gas can be sampled from the full tunnel ML at a flow rate reflecting a weighting factor in each phase interval, and sampling using the one exhaust gas bag B makes it possible to measure the particulate matter or other materials in accordance with predetermined regulations.

In addition, the third embodiment is configured to be able to analyze the measurement target component in the exhaust gas using both the filter F and the exhaust gas bag B, but may be configured to analyze the measurement target component in the exhaust gas using only any one of the filter F and the exhaust gas bag B. In this case, the main flow path ML may be provided with only any one of the sampling flow path L1 and the bag flow path L5.

Note that the present invention is not limited to any of the above-described embodiments.

For example, in the above-described embodiments, the flow rate conditions corresponding to respective regions or phases are weighting factors stipulated in regulations, but may be flow rates or a flow rate ratio. Also, when the ratio among weighting factors in Phases 1, 2, 3, and 4 is 0.754: 0.754:1:1, split flow ratios or split flow rates in the respective phase intervals only have to be set to values reflecting these weighting factors.

In addition, the filter is not necessarily required to be provided in the diluted exhaust gas flow path. For example, a continuous PM meter or other various exhaust gas analysis devices may be provided to measure PM in the diluted exhaust gas.

Further, the present invention may include mass flow controllers respectively provided in the diluent gas supply path and the diluted exhaust gas flow path.

Also, the measurement accuracy of a mass flow controller is likely to be affected by exhaust gas, and therefore, in order to accurately control the flow rates of the diluent gas and diluted exhaust gas, the present invention preferably include venturi flowmeters as in the above-described embodiments.

In addition, each of the above-described exhaust gas analysis apparatus is one having the one dilution tunnel, but may be configured to multiple dilution tunnels and dilute the exhaust gas discharged from the internal combustion engine in a multistep manner.

The calibration method described in the second embodiment may be applied to the first embodiment. In this case, it is only necessary to calibrate the first flowmeter with the second flowmeter as a reference. Even in such a case, since the relative relationship between the respective flowmeters is kept, the dilution ratio can be accurately kept, and PM or the like can be accurately measured as in the second embodiment.

In place of the filter used as the collection part in each of the embodiments, a diffusion changer sensor (DCS) that fulfill functions as the collection part and the analysis part may be installed to simultaneously collect and analyze the measurement target component. Also, a particle number (PN) measurement device may be provided so as to fulfill functions as the collection part and the analysis part in place of the filter.

Further, a bag mini-diluter (BMD) can also be applied to the present invention, and measurement and analysis reflecting weighting based on regulations can be performed in the same manner.

The present invention is applicable not only to the test that actually runs a vehicle, but also to a test using, for example, an engine dynamometer or the like, only for an internal combustion engine. That is, in the case of a test for a part of a vehicle as well, the present invention can produce the same effects as described above.

Besides, it should be appreciated that the present invention is not limited to any of the above-described embodiments, and various variations and parts of the respective embodiments can be combined without departing from the scope thereof.

REFERENCE SIGNS LIST

100: Exhaust gas analysis apparatus
F: Filter
L3: Diluted exhaust gas flow path
20: Split flow ratio control mechanism

The invention claimed is:

1. An exhaust gas analysis apparatus comprising:
a diluent gas supply path through which diluent gas flows;
a dilution tunnel configured to receive the diluent gas from the diluent gas supply path and receive sampling exhaust gas partially or wholly split from original exhaust gas that flows through a main flow path, and to output diluted exhaust gas by mixing the diluent gas and the sampling exhaust gas;
a collection part configured to receive a total amount of the diluted exhaust gas from the dilution tunnel and to collect a measurement target component in the diluted exhaust gas; and
a split flow ratio control mechanism, including a main flowmeter that measures a flow rate of the original exhaust gas that flows through the main flow path, configured to, during a test of a vehicle or a part of the vehicle, change and control a split flow ratio upstream of the dilution tunnel in accordance with a vehicle driving mode set in compliance with a predetermined regulation based on at least the flow rate of the original exhaust gas measured by the main flowmeter, wherein the split flow ratio is a ratio of a split flow rate of the sampling exhaust gas to a total flow rate of the original exhaust gas.

2. The exhaust gas analysis apparatus according to claim 1, wherein
in multiple phase intervals constituting a driving mode, the diluted exhaust gas flows to the collection part in common.

3. The exhaust gas analysis apparatus according to claim 1, wherein
the driving mode has multiple phase intervals,
weighting factors are set for the respective phase intervals, and
the split flow ratio control mechanism is configured to change the split flow ratio in dependence on the weighting factors set for the respective phase intervals.

4. The exhaust gas analysis apparatus according to claim 1, wherein
the driving mode includes
a cold start region having one or more phase intervals and in which the vehicle is cold started; and
a hot start region having one or more phase intervals and in which the vehicle is hot started,
weighting factors are respectively set for the cold start region and the hot start region, and
the split flow ratio control mechanism is configured to change the split flow ratio in dependence of the weighting factors set for the cold start region and the hot start region.

5. The exhaust gas analysis apparatus according to claim 4, wherein
the cold start region has a first phase interval and a second phase interval,
the hot start region has a third phase interval,
a ratio among weighting factors respectively for the first phase interval, the second phase interval, and the third phase interval is set to $a:1:(1-a)$, and
the split flow ratio control mechanism is configured to change the split flow ratio among the respective phase intervals so that a ratio among split flow ratios in the first phase interval, the second phase interval, and the third phase interval becomes $1/a:1:1/(1-a)$.

6. The exhaust gas analysis apparatus according to claim 1, further comprising:
the main flow path through which the original exhaust gas flows;
a sampling flow path through which the sampling exhaust gas splitting from the original exhaust gas flows; and a diluted exhaust gas flow path that is a flow path after merger of the sampling flow path and the diluent gas supply path.

7. The exhaust gas analysis apparatus according to claim 6, wherein the split flow ratio control mechanism comprises:

a first flowmeter that measures a flow rate of the diluent gas flowing through the diluent gas supply path;

a flow rate control valve that is provided in the diluent gas supply path;

a second flowmeter that measures a flow rate of diluted exhaust gas flowing through the diluted exhaust gas flow path;

a split flow ratio setting part that sets a target split flow ratio in accordance with a driving mode, a target flow rate calculation part that, on a basis of the target split flow ratio set by the split flow ratio setting part, the total flow rate of the original exhaust gas, the total flow rate being measured by the main flowmeter, and a measured flow rate of the diluted exhaust gas, the measured flow rate being measured by the second flowmeter, calculates a target flow rate of the diluent gas flowing through the diluent gas supply path, and a first controller that controls the flow rate control valve so that a deviation between a measured flow rate of the diluent gas, the measured flow rate being measured by the first flowmeter, and the target flow rate calculated by the target flow rate calculation part decreases.

8. The exhaust gas analysis apparatus according to claim 7, wherein the split flow ratio control mechanism further comprises:

a pump provided in the diluted exhaust gas flow path; and a second controller that controls the pump so that the flow rate of the diluted exhaust gas flowing through the diluted exhaust gas flow path becomes constant at a predetermined flow rate.

9. An exhaust gas analysis system comprising:

the exhaust gas analysis apparatus according to claim 1; and an analysis part that analyzes the measurement target component collected by the collection part.

10. An exhaust gas analysis method using an exhaust gas analysis apparatus comprising a diluent gas supply path through which diluent gas flows, a dilution tunnel configured to receive the diluent gas from the diluent gas supply path and receive sampling exhaust gas partially or wholly split from original exhaust gas that flows through a main flow path, and to output diluted exhaust gas by mixing the diluent gas and the sampling exhaust gas, a collection part configured to receive the diluted exhaust gas from the dilution tunnel and to collect a measurement target component in the diluted exhaust gas, and a main flowmeter that measures a flow rate of the original exhaust gas that flows through the main flow path, the exhaust gas analysis method comprising:

introducing a total amount of the diluted exhaust gas from the dilution tunnel to the collection part; and during a test of a vehicle or a part of the vehicle, changing and controlling a split flow ratio upstream of the dilution tunnel in accordance with a vehicle driving mode set in compliance with a predetermined regulation based on at least the flow rate of the original exhaust gas measured by the main flowmeter, wherein the split flow ratio is a ratio of a split flow rate of the sampling exhaust gas to a total flow rate of the original exhaust gas.

\* \* \* \* \*